United States Patent
Riley

[15] 3,667,061
[45] May 30, 1972

[54] BIDIRECTIONAL DC SIGNAL DETECTOR WITH TRANSFORMER ISOLATION

[72] Inventor: John A. Riley, Williamsville, N.Y.
[73] Assignee: Westinghouse Electric Corporation, Pittsburgh, Pa.
[22] Filed: July 16, 1970
[21] Appl. No.: 55,316

[52] U.S. Cl..............................329/104, 307/234, 328/111, 329/106, 329/122
[51] Int. Cl. .........................................................H03k 9/08
[58] Field of Search.................329/102, 104, 106, 122, 150, 329/151; 328/111; 307/234; 318/341; 325/320; 332/12

[56] References Cited

UNITED STATES PATENTS

| | | |
|---|---|---|
| 2,563,256 | 8/1951 | Lord et al. ..........................329/106 X |
| 3,136,960 | 6/1964 | Ausfresser ..........................329/106 X |
| 3,139,595 | 6/1964 | Barber.....................................332/12 |
| 3,199,011 | 8/1965 | Sikorra..................................318/341 |
| 3,241,023 | 3/1966 | Eby....................................318/341 X |

Primary Examiner—Alfred L. Brody
Attorney—F. H. Henson, C. F. Renz and A. S. Oddi

[57] ABSTRACT

A system for detecting a direct current (DC) signal in magnitude and direction, when electrical isolation is required between the DC signal being detected and the stage producing the output signal, employing an oscillator whose mark and space time durations are modulated according to the magnitude and direction of the DC signal being detected and wherein the so-modulated output of the oscillator is symmetrically amplitude limited to provide signals having a DC component corresponding to the DC signals being detected and the DC components are extracted to provide an output indication of the magnitude and direction of the DC signal being detected.

9 Claims, 2 Drawing Figures

BIDIRECTIONAL DC SIGNAL DETECTOR WITH TRANSFORMER ISOLATION

CROSS REFERENCES TO RELATED APPLICATION

The present application relates to an improvement on copending application Ser. No. 49,310 filed June 24, 1970 by B. J. Bixby and assigned to the same assignee as the present application.

BACKGROUND OF THE INVENTION

Field of the Invention

The present invention relates to DC signal detection systems and, more particularly, to such systems capable of detecting both the direction and magnitude of the DC signal.

A common method of detecting a direct current in the prior art where it was desired to provide electrical isolation between the signal being detected and the output is the use of a pair of transformers having separate cores of a saturable material wherein the primary and secondary windings are respectively connected in series. An alternating current signal in the form of, for example, a square wave, is applied across the series connecting primary windings and the DC to be detected is supplied to the secondary windings so that the positive and negative time durations of the AC signal are modulated thereby, since the presence of the DC causes one of the magnetic cores to be saturated sooner than would be the case if no DC were applied. The modulation of the time durations is detected typically through the use of a full wave diode bridge in the primary circuit whose output comprises a unidirectional signal corresponding to the magnitude of the DC being detected. However, it should be noted that no indication is given as to the direction of the DC being detected.

In the cross-referenced copending application by Bixby, a system is disclosed wherein both the magnitude and direction of a DC signal may be detected and which requires only the use of a single transformer ensuring symmetry of operation. The system disclosed by Bixby employs a free running Royer type of oscillator which is coupled via primary windings of the transformer and which provides equal positive and negative time durations in the absence of DC to be detected. In the presence of DC to be detected the oscillator provides durations whose inequality serves as an indication of the magnitude and direction of the DC to be detected. The durations are utilized to control the conductive and non-conductive periods of a switching device whose output is then integrated to provide a unidirectional output indicative of the relationship between the conductive and non-conductive periods of the switching device. The output of the integrator is then differentially compared with a reference so that a null output is provided when the time durations are substantially equal and positive and negative outputs, respectively, when the durations differ in the respective directions. The differential output is thus an indication of both the magnitude and direction of the original DC signal being detected.

The present invention comprises an improvement over the described copending application and provides further advantages of providing temperature stability over wide ranges of operating temperatures and providing a system which has a wide bandwidth response, so that the system can quickly respond to changes within a control system. Moreover, the present system eliminates the need for providing a reference for comparison by employing techniques which inherently provide an indication of the direction and magnitude of the DC signal being detected.

DESCRIPTION OF THE PREFERRED EMBODIMENT

Figure 1:
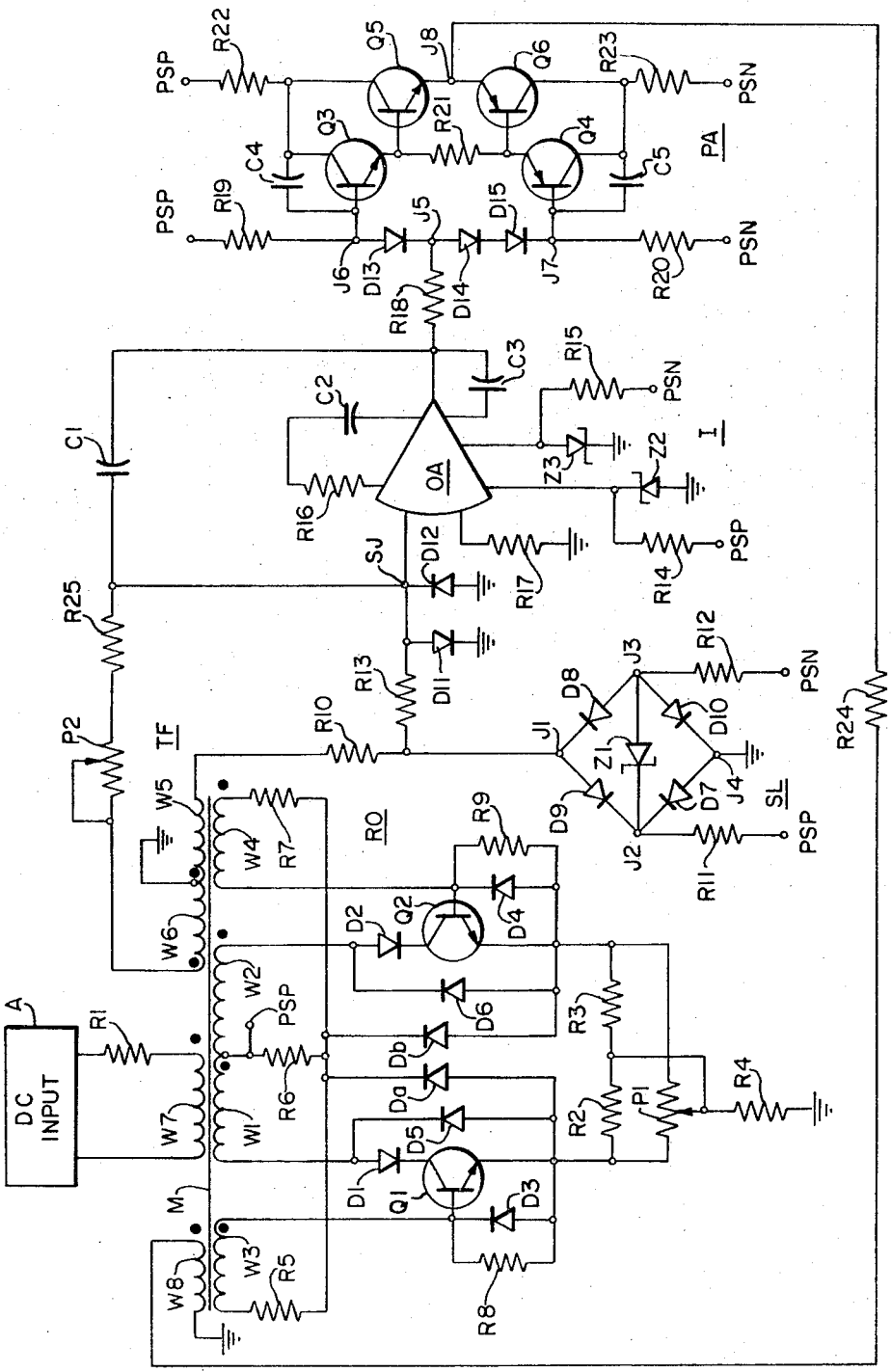
FIG. 1 is a schematic-block diagram of the detection system of the present invention.

Referring now to the FIG. 1, the detection system includes a free running oscillator, commonly called a Royer oscillator, RO, which includes a pair of transistors Q1 and Q2 which are alternately conductive. A transformer TF is employed including a core M comprising a substantially square BH loop magnetic material. Primary windings W1 and W2, and secondary windings W3 and W4 of the transformer TF are utilized for coupling the transistors Q1 and Q2 of the oscillator RO. The transformer TF is also provided with secondary windings W5 and W6, a signal input winding W7 and a feedback input winding W8. The DC signal to be detected is applied to the winding W7 from a DC input A with a current limiting resistor R1 being connected in series with the winding W7.

Assume initially that no DC signal is applied to the winding W7 and that the transistor Q1 is conductive and the transistor Q2 is non-conductive. Current is thus provided from a source of positive polarity direct voltage represented by terminals labeled PSP (power supply positive) connected at the junction of the windings W1 and W2, into the dotted end of the winding W1, through a diode D1 and the collector-emitter circuit of the transistor Q1. The diode D1 comprises a fast acting diode which insures a fast rise output waveform from the transistor Q1 when it switches. The emitters of the transistors Q1 and Q2 are returned to ground via a voltage divider network including resistors R2, R3, potentiometer P1, and resistor R4. The resistors R2 and R3 are connected in series between the emitters of the transistors Q1 and Q2 and the potentiometer P1 connected directly in parallel therewith. The tap on the potentiometer P1 is connected to the junction point of the resistors R2 and R3 and is connected to ground via the resistor R4. The transistor Q1 is maintained in conduction by base drive current supplied from the winding W3 which has its dotted end connected to the base of the transistor Q1 with the undotted end of the winding W3 being connected via resistors R5 and R6 to the PSP terminal. The conduction of the transistor Q1 continues until the magnetic material of the core M is driven in to positive saturation. This causes the voltage across the winding W3 to collapse thereby removing base drive from the transistor Q1 which accordingly turns off. Magnetizing current having been removed from the transformer TF, the core material will return to a remanent flux level, which, in addition to current supplied from the PSP terminal through the resistor R6 and a resistor R7 connected to the dotted end of the winding W4 with the undotted end thereof being connected to the base of the transistor Q2 will cause base drive current to be supplied to the base of the transistor Q2 which will render this device conductive. Current is thus supplied from the PSP terminal into the undotted end of the winding W2, through a diode D2, which comprises a fast acting diode corresponding to the diode D1, the collector-emitter circuit of the transistor Q2, through the divider network to ground. The transistor Q2 is maintained in conduction via the winding W4 whose undotted end at the base of the transistor Q2 is positive with current flow into the undotted end of the winding W2.

The transistor Q2 remains in the conductive state until the magnetic material of the core M is driven into negative saturation at which time the voltage across the windings W4 and W3 collapses thereby removing base drive from the transistor Q2 which turns off. In response to the magnetic material running back to a remanence level and current supplied to the winding W3 from the PSP terminal, the resistor R6, resistor R5 into the dotted end of the winding W3, base drive current is supplied to the transistor Q1 thus turning it on. Current is then supplied to the transistor Q1 from the PSP terminal into the dotted end of the winding W1, through the fast acting diode D1 and the collector emitter circuit of the transistor Q1. A complete cycle of operation for the oscillator RO is thus defined.

The oscillator RO includes a resistor R8 and a resistor R9, respectively, connected between the base and emitter electrodes of the transistors Q1 and Q2. A diode D3 and a diode D4 are connected from anode to cathode between the emitter and base electrodes of the transistors Q1 and Q2, respectively, to protect the base emitter junctions thereof. Also a diode D5 and a diode D6 are connected from anode to cathode between the emitter electrodes of the transistors Q1 and Q2, respectively, and the anode electrodes of the fast acting diodes D1 and D2 to prevent reverse voltages from appearing across the transistors Q1 and Q2, respectively. A diode D$a$ and a diode D$b$ are connected from anode to cathode between the emitter electrodes of the transistors Q1 and Q2, respectively, to the common bottom connection of the resistors R5, R6, and R7. The function of the diodes D$a$ and D$b$ is to provide a return path for base-emitter current when the associated transistor conducts.

The oscillations of the oscillator RO are sensed by the secondary winding W5 which has its dotted end grounded and the undotted end connected via a resistor R10 to a junction point J1 of a symmetrical limiter SL. The symmetrical limiter SL comprises a diode bridge including diodes D7, D8, D9, and D10 with a Zener diode connected from cathode to anode between junction points J2 and J3 of the bridge. The opposite junction point J4 from the junction J1 is connected to ground thus effectively connecting the winding W5 across the symmetrical limiter bridge. The Zener diode Z1 has a bias voltage applied thereto via a biasing network including a resistor R11 connected between a PSP terminal and the J2 junction point and a resistor R12 connected between the junction point J3 and PSN (power supply negative) terminal (supplying a negative direct voltage thereto). The bias voltage is used to cause the Zener diode Z1 to be conductive such that capacitance effects of the Zener diode Z1 will be minimized when the Royer oscillator RO switches its conducting transistors.

Figure 2:
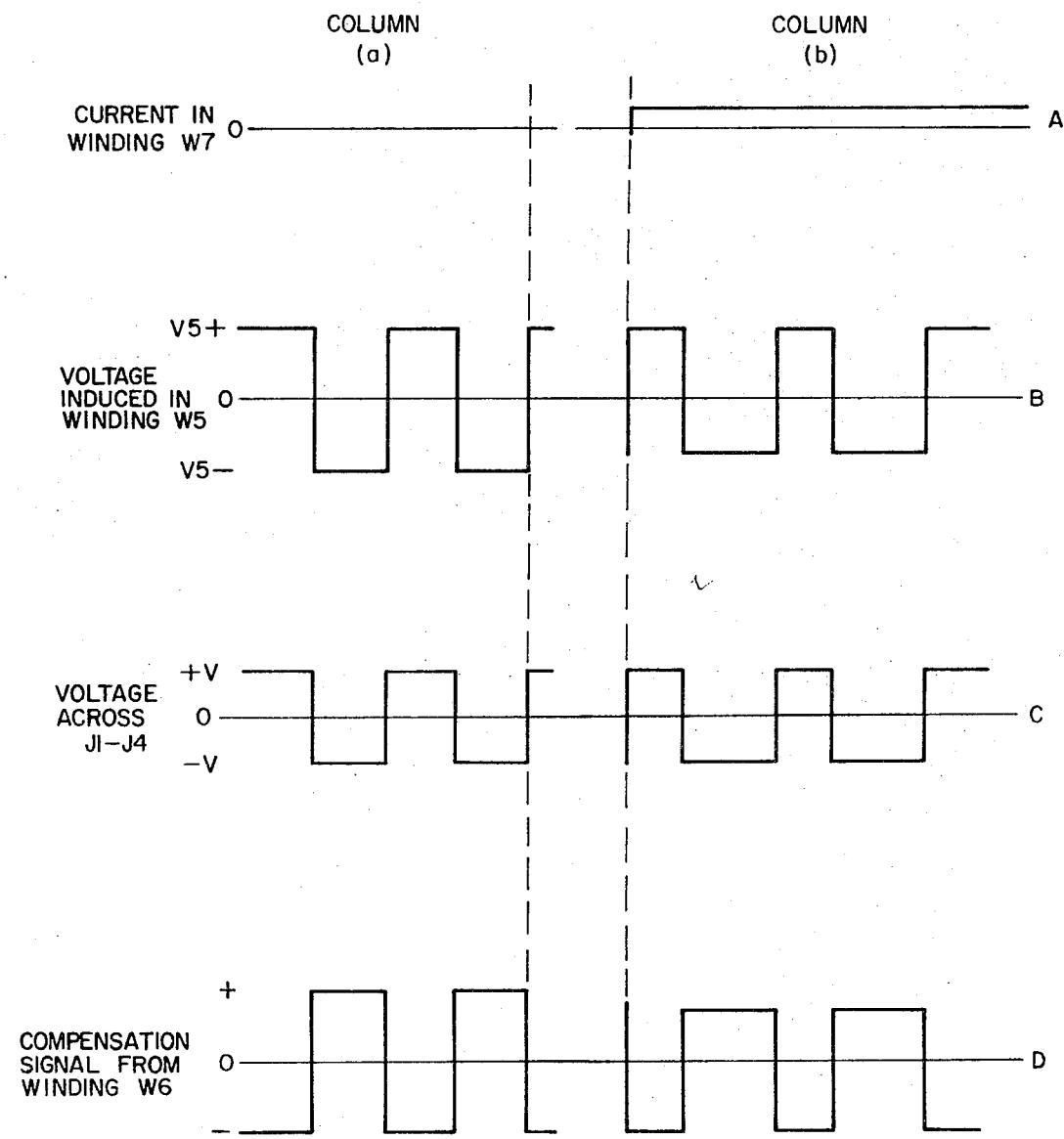
FIG. 2 is a chart of waveforms illustrating some operational aspects of the system of FIG. 1.

Under the assumption of no input DC signal to the winding W7 (curve A in FIG. 2 Column (a)), an alternating voltage will appear across the winding W5. This voltage will have equal positive and negative amplitudes and the mark-space timing will be equal. During the time that the transistor Q1 is conductive the undotted end of the winding W5 will be negative causing a voltage exceeding the voltage of the Zener Z1 to be applied thereacross via diodes D7 and D8 of the bridge. Thus, a negative voltage with respect to ground will appear across the circuit junctions J1 and J4 of the symmetrical limiter SL. During the half-cycle when the transistor Q2 is conductive, the undotted end of the winding W5 will be positive which will apply a voltage to the Zener diode Z1 via the diodes D9 and D10 of the value exceeding the threshold value thereof so that the voltage appearing across the junctions J1 and J4 will be positive with respect to ground. Due to the clamping action of the Zener diode Z1 at its threshold value for both half-cycles of operation, the magnitude of the positive and negative excursions of voltage appearing across the junction J1 and J4 will be equal. Hence under the assumed condition of zero DC input to the winding W7, the voltage appearing across the symmetrical limiter at the junction J1 and J4 will have a zero DC component since the positive and negative amplitude excursions are equal and also the mark-space time durations. If the amplitude and the mark-space durations of the output of the winding W5 should differ, the symmetrical limiter would cause equal amplitude positive and negative amplitudes to appear; however, the limiter would not affect the time durations of the respective mark-space voltages. The net result would be that the output of the symmetrical limiter SL would have a DC component as will be explained in further detail below.

It is to be noted that the use of the Zener diode Z1 and the diodes D7, D8, D9, and D10 in the bridge configuration provide temperature stability if the temperature coefficients of the Zener diode and the resulting pair of conductive diodes are selected to cause cancellation. Output voltages are provided thereby, substantially independent of temperature. The junction point J1 in the symmetrical limiter SL is connected through a resistor R13 to a summing junction SJ associated with the input of an operational amplifier OA integrator having an integrating capacitor C1 connected between the output and the summing junction SJ so that the output of the operational amplifier OA integrator is the integral of the input thereto. A diode D11 is connected from anode to cathode between the summing junction SJ and ground and a diode D12 is connected from cathode to anode between the summing junction SJ and ground. The functions of the diodes D11 and D12 are to prevent the summing junction voltage from exceeding the voltage level of the forward drops of the diodes D11 and D12 in the positive and negative directions, respectively, and thereby protect various semiconductor junctions within the operational amplifier OA. A positive operating voltage is supplied to the operational amplifier OA via a voltage divider network including a resistor R14 and a Zener diode Z2 connected between a PSP terminal and ground so that a fixed positive voltage is supplied to the operational amplifier OA. Also a voltage divider network including a resistor R15 and a Zener diode Z3 is connected between a PSN terminal and ground to provide a fixed negative operating voltage to the operational amplifier OA. The operational amplifier OA is also provided with series connection of a capacitor C2 and a resistor R16 and also a capacitor C3 connected from the output. The function of the component C2, R16 and C3 is to set the frequency roll-off of the operational amplifier OA. A balancing resistor R17 is connected from another input of the operational amplifier OA to ground and serves the function of providing balanced input impedances for the operational amplifier OA. A typical operational amplifier which could be utilized in the present system is the industry-termed 709. The integrated signal supplied by the output of the operational amplifier OA is applied via a resistor R18 to the input junction J5 of a power amplifier PA.

The junction J5 is in a voltage divider network which includes a resistor R19 and a diode D13 connected between a PSP terminal and the junction J5 and a pair of diodes D14 and D15 and a resistor R20 connected between the junction J5 and a PSN terminal. When the integrator I supplies a positive or negative output, the voltage level of the junction J5 will appropriately be raised or lowered. The base of an NPN-transistor Q3 is connected to a junction point J6 between the resistor R19 and the diode D13. The base of a PNP-transistor Q4 is connected to a junction point J7 between the diode D15 and the resistor R20. Accordingly, if the voltage at the junction J5 goes positive, the junction J6 goes more positive causing the transistor Q3 to provide more output current. Conversely, if the junction point J5 goes negative, the junction point J7 will go more negative thereby increasing the conductivity of the PNP-type transistor Q4 and providing greater output current.

The transistor Q3 is connected to an NPN-type of transistor Q5 in a Darlington amplifier configuration, that is, the collector electrodes are commonly connected and the emitter electrode of the transistor Q3 is connected to the base electrode of the transistor Q5. A resistor R22 connects the collectors of the transistors Q3 and Q5 to a PSP terminal. The output of the Darlington amplifier Q3–Q5 is taken at the emitter of the transistor Q5 at a junction J8. As the transistor Q3 supplies more base emitter current to the transistor Q5, the output current at the junction J8 will accordingly increase.

In a complementary fashion the transistor Q4 is connected in a Darlington configuration with a transistor Q6 which is also of the PNP type with the emitter of the transistor Q4 connected to the base of the transistor Q6 and the collectors thereof commonly connected through a resistor R23 to a PSN terminal. The emitter of the transistor Q6 is connected to the junction point J8. As the transistor Q4 supplies increased emitter base current to the transistor Q6, transistor Q6 will supply an increased current flow into the junction J8, that is, in a direction opposite to the output provided by the transistor Q5. The output junction point J8 of the power amplifier PA is connected via a feedback resistor R24 to the dotted end of the winding W8 which has its other end grounded.

In the example under consideration where no DC signal is supplied to the winding W7 and equal amplitude and equal mark-space duration signals are sensed by the winding W5, the input to the integrator I from the symmetrical limiter will contain no DC component, thus the output of the integrator will be substantially zero volts which when applied to the junction J5 of the power amplifier will provide a zero current output at the junction J8 to be applied to the winding W8. The potentiometer P1 in the emitter circuits of the transistors Q1 and Q2 of the oscillator RO is adjustable to ensure that zero current appears in the winding W8 when the zero input current is applied to the winding W7.

Assume now that a direct current is provided by the DC input A via the resistor R1 into the dotted end of the winding W7 (curve A, FIG. 2 Column (b)). Due to the dot convention between the winding W7 and the primary windings W1 and W2, this direction of direct current will be detected in the primary windings such that the indicated direction of current in the winding W7 will aid the current in the winding W1 to drive the core M into positive saturation while it will oppose the current in the winding W2 in reaching negative saturation of the core M. Thus, during the time that the transistor Q1 is conductive, with the current into the dotted end of the winding W7, it will take less time for the core M to be driven from negative saturation to positive saturation when the transistor Q1 is turned off. Conversely, it will take a longer time, as compared to the zero input current case, for the magnetic core M to be driven from positive saturation to negative saturation and, therefore, the transistor Q2 will remain conductive for a longer period of time. The net result is that the time duration that the transistor Q1 is conductive is shorter than the time that the transistor Q2 is conductive. It also follows that the voltage induced across the winding W5 (curve B, FIG. 2 Column (b)) will be a higher magnitude during the time that the transistor Q1 is conductive and will be of a lower value during the time period that the transistor Q2 is conductive due to the fact that the volt-seconds required for saturation from negative to positive saturation is the same as required for positive to negative saturation.

The bidirectional signal appearing across the winding W5, having different amplitudes and time duration during the respective positive and negative time durations thereof (curve B, FIG. 2 Column (b)) is applied to the symmetrical limiter SL wherein the amplitudes are both limited to the same magnitude. The signal thus appearing across the junction points J1 and J4 is a bidirectional signal having equal amplitudes in the positive and negative direction but having unequal time durations. (curve C, FIG. 2 Column (b)) In other words, during the time period (the mark time duration) that the transistor Q1 is conductive, a negative voltage having a predetermined value is provided across the junction points J1 and J4 for the time period that the transistor Q1 is conductive. During the time period (the space time duration) that the transistor Q2 is conductive, a positive voltage of the same predetermined amplitude appears across the junctions J1 and J4. It can thus be seen that the composite signal which appears across the junction points J1 and J4 has a DC value, which in the present case will be a positive DC value since the space time duration is greater than the mark time duration, which will correspond to the magnitude of the current in the winding W7 and also to the direction thereof.

By the application of the bidirectional output across the junction points J1 and J4 to the integrator I, the DC component thereof may be extracted for application to the input junction J5 of the power amplifier PA.

The signal across the symmetrical limiter includes an alternating component alternating at the frequency of operation of the oscillator RO which must be limited from the output of the integrator I. One technique of accomplishing this is to utilize a large integrating capacitor C1 so that the time constant of the integrator I is relatively large. This, however, has the disadvantage of limiting the frequency response of the system, thereby preventing the system from responding to the rapid changes in circuit conditions. The present invention avoids the requirement for a large integrating capacitor C1, which would reduce the bandwidth of the system by the application of a compensation signal to the operational amplifier OA integrator.

The compensation signal is developed across the winding W6 which has its undotted end connected to ground and its dotted end connected via a potentiometer P2 and a resistor R25 to the input of the operational amplifier OA. Note that the winding configuration of the winding W6 is opposite to that of the winding W5. Therefore, the output of winding 6 will be 180° out of phase with the output of the winding W5. Accordingly, at the input of the operational amplifier OA the bidirectional signal from the symmetrical limiter SL (curve C, FIG. 2 Column (b)) applied via the resistor R13 will be 180° out of phase with the unlimited compensation signal (curve D, FIG. 2 Column (b)) applied via the potentiometer P2 and the resistor R25. Thus the alternating components of the limited waveform from the symmetrical limiter SL will be canceled by the inverted unlimited compensation waveform from the winding W6. The magnitude of the compensation signal can be adjusted by the potentiometer P2 to insure effective cancellation. The DC component in the output of the symmetrical limiter SL will be unaffected in that the unlimited output of the winding W6 does not include a DC component. The resultant input to the operational amplifier OA is thus the DC component with a substantial portion of the alternating components which originally appeared across the junction points J1 and J4 of the symmetrical limiter SL having been cancelled.

It should be understood that the curves of FIG. 2 Column (b) are transitional curves, and that, except for the signal input, the curves for the system in the settled state will revert to the forms as in FIG. 2 Column (a) because the system is a "zero error" system due to the integrator.

In that a substantial percentage of the alternating components at the input of the operational amplifier OA have been canceled the integrating capacitor C1 may be relatively small in that there is no necessity that the alternating components now be attenuated with a long time constant integrator. Thus, the bandpass of the system now provided is substantially wider than could otherwise be provided without the provision of the cancelling compensation signal. Therefore, the present system provides for rapid response to changes in system conditions which would not otherwise be provided.

In the present example, with direct current into the dotted end of winding W7, the positive going input to the operational amplifier OA is inverted therein and thus appears as a corresponding negative going signal which is applied to the junction point J5 of the power amplifier PA. The Darlington amplifier Q4–Q6 is thus driven more heavily into conduction causing current flow into the junction point J8 and accordingly current flow out of the dotted end of the winding W8 and through the resistor R24. The magnitude of the current flow out of the dotted end of the winding W8 is directly proportional to the input current into the dotted end of the winding W7 and may be measured or utilized as a direct indication thereof corresponding in both direction and magnitude.

The operation of the detection system for the converse situation when current flows out of the dotted end of the winding W6 is similar. In this instance the current out of the dotted end of the winding W7 will aid the current flow through the winding W2 and oppose that through the winding W1. Thus, the conductive time (space time duration) of the transistor Q2 will be shorter than the conductive time (mark time duration) of the transistor Q1 with the voltage being sensed across the winding W5 being greater during the conductive period of the transistor Q2 as compared to the smaller voltage during the conductive period of the transistor Q1. The output of the winding W5 will be amplitude limited in the symmetrical limiter SL and thus will have a DC component which will be negative. The AC components of the output of the symmetrical limiter SL will be cancelled by the unlimited compensation signal supplied at the input of the operational amplifier OA.

The negative DC component will be inverted in the operational amplifier OA and appear as a positive going signal at the junction point J5 of the power amplifier PA. Positive going signal will cause the Darlington pair Q3–Q5 to be rendered more heavily conductive which will supply current out of the junction point J8 into the dotted end of the winding W8, with the current being provided to the winding W8 being directly proportional to the input current to the winding W7 and indicative of the direction of the current flow.

In summary, it can be seen that the detection system of the present invention provides a detected output indicative of the magnitude and direction of the DC signal being detected which, for example, may be desired for monitoring the current through an armature of a DC machine and wherein the input and output signals are electrically isolated. Additionally, the use of the symmetrical limiter SL including a diode bridge and Zener diode for deriving the DC component of the output of the oscillator provides inherent temperature stability. Additionally, the use of the compensation signal for cancelling out the AC components from the symmetrical limiter provides for wide bandwidth response of the system and permits the system to respond rapidly to circuit changes. Additionally, the use of the symmetrical limiter which inserts the DC component eliminates the need for a reference signal otherwise required for defining the zero input current case for detection.

I claim as my invention:

1. In a system for detecting the magnitude and direction of a direct current signal, the combination of:
    transformer means including saturable magnetic core means and first and second winding means;
    means for applying said direct current signal to be detected to said first winding means;
    an oscillator circuit coupled via said second winding means for oscillation with substantially equal polarity amplitudes and mark and space time durations in the absence of said direct current signal to be detected and with unequal polarity amplitudes and time durations in the presence of said direct current signal to be detected;
    symmetrical limiter means responsive to said mark and space time durations and providing a limited bidirectional signal having substantially equal polarity amplitudes and mark and space time durations corresponding to said mark and space time durations of said oscillator, so that said limited signal has a direct current component corresponding in magnitude and direction to said direct current to be detected;
    means responsive to said limited signal for providing a component signal corresponding to said direct current component; and
    means responsive to said component signal for providing a detected signal indicative of the magnitude and direction of said direct current signal to be detected.

2. The combination of claim 1 wherein:
    said limiting means includes devices connected in a bridge configuration to be relatively unresponsive to temperature changes so that said limited signal including said direct current component is provided corresponding to said direct current signal to be detected substantially free of variations due to temperature.

3. The combination of claim 1 includes:
    compensation means responsive to said mark and space time durations of said oscillator for providing unlimited bidirectional signals corresponding in polarity amplitude and time durations to said oscillator and in opposite phase to said limited signal;
    means for combining said limited and unlimited signals so that alternating components of said limited signal will tend to be canceled prior to response by said means responsive to said limited signals.

4. The combination of claim 1 wherein:
    said transformer means includes third winding means responsive to said mark and space time durations of said oscillator,
    said limiting means includes said third winding means and a bridge circuit operatively connected across said third winding means and including a threshold device operative to limit the voltage excursion of both polarities to a predetermined value.

5. The combination of claim 3 wherein:
    said transformer means includes third and fourth winding means responsive to said mark and space time duration of said oscillator,
    said limiting means includes said third winding means and a bridge circuit operatively connected across said third winding means and including a threshold device operative to limit the voltage excursions of each polarity to a predetermined value, and
    said compensation means includes said fourth winding means.

6. The combination of claim 1 wherein:
    said means responsive to said limited signal includes integrating means for the integration of said limited signal applied thereto to derive said output signal.

7. The combination of claim 3 wherein:
    said means responsive to said limited signal includes means for the integration of said limited signal applied thereto to derive said component signal,
    said integrating means includes an operational amplifier and a capacitor connected in a feedback loop thereof,
    said means for combining is connected to the input of said operational amplifier with the cancellation of said alternating current components of said limited signal providing a wider bandwith for said integrating means.

8. The combination of claim 1 wherein:
    said transformer means includes feedback input winding means responsive to said detected signal and being so wound that current responsive to the detected signal is supplied thereto in a direction opposite to the direction of said direct current signal to be detected as applied to said first winding means.

9. The combination of claim 8 wherein:
    said means responsive to said compensation signal includes an amplifier for providing said detected output to said feedback input winding means at an amplified level.

* * * * *